Jan. 18, 1938.  J. LYONS  2,105,668
COLLAR
Filed Feb. 19, 1937

Inventor
Joseph Lyons
by Rippey & Cassidy
His Attorneys

Patented Jan. 18, 1938

2,105,668

UNITED STATES PATENT OFFICE 2,105,668

COLLAR

Joseph Lyons, St. Louis, Mo., assignor to New Era Shirt Company, St. Louis, Mo., a corporation of Missouri Application February 19, 1937, Serial No. 126,657

1 Claim. (Cl. 2—143)

This invention relates to collars, and has special reference to collars of the turned down type, irrespective of whether the collars are permanently attached to the shirt or are detachable.

Objects of the invention are to provide a collar of the turned down type having therein a thermoplastic strip of adhesive coated material that will retain its proper form even after having passed through the laundry repeatedly and even after it becomes separated from an adjacent part of the collar band with which it is in contact, as a result of the application of heat and pressure; to provide in a turned down collar a relatively narrow strip that provides a definite fold line along the union of the cape and the collar band; to provide a turned down collar embodying structural features and elements whereby the thickness of the collar at the fold line, and perhaps elsewhere, is considerably reduced beyond the thickness of the conventional collars and even beyond the thickness of collars that have heretofore been constructed with an element between the inner and outer plies of the collar characterized as thermoplastic; and to provide in a turned down collar a thermoplastic strip of relatively narrow width and of sufficient length that will make the collar resistant against wilting as a result of perspiration, etc.

Other objects of the invention should be readily apparent from the following description, reference being made to the annexed drawing, in which—

Figure 1:
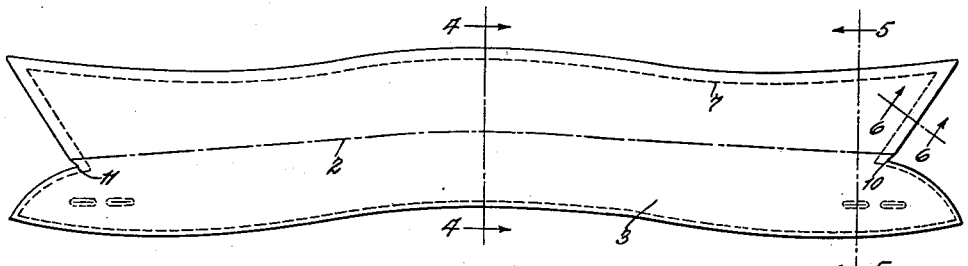
Fig. 1 is a view showing a turned down collar extended and unfolded and embodying the features of the present invention.

As shown, my improved turned down collar is composed of three plies of textile fabric, with an interposed thermoplastic strip embodied and confined in the band of the collar exclusively and which does not extend into the collar cape, whereby said strip gives to the collar a definite fold line defining the cape and the band.

The outer ply 1 is a unitary piece of textile fabric shaped to form a band portion and a cape portion, as shown, which are united along a definite fold line 2. The inner ply 3 may be of the same material as the outer ply and of the same dimensions. A textile lining section 4 of slightly less length and width than, but of the same shape as, the plies 1 and 3 is interposed between said plies and, in the finished collar, the margins 5 and 6 of the plies 1 and 3, respectively, are turned inwardly entirely along their edges and are attached together by stitches 7.

Figure 2:
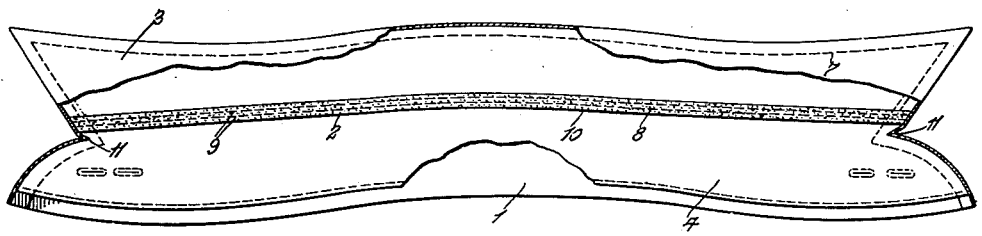
Fig. 2 is a similar view showing portions of one of the plies and the lining broken away to illustrate the thermoplastic strip defining the fold line of the collar.
Figure 3:
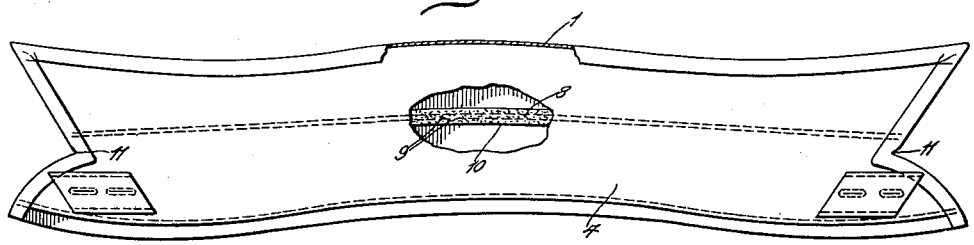
Fig. 3 is a plan view, with parts in section, showing the lining superimposed upon the outer ply and the interposed thermoplastic coated strip that defines the fold line as between the cape and the band of the collar.

To the lining section 4 a narrow strip 8 of known thermoplastic fabric is attached by spaced and approximately parallel lines of stitching 9. The lining section 4 is interposed between the outer ply 1 and the inner ply 3 and has its margins extending into the folded margin 5 or the folded margin 6 and attached to the outer and inner plies 1 and 3 by stitches 7, so that these parts are held in relatively immovable positions along their margins. In this arrangement and relationship, the strip 8 is supported between the outer ply 1 and the intermediate lining member 4 of the collar so that the upper margin 10 of said strip is below the corners 11 formed at the intersection and union of the cape with the band of the collar (Fig. 2).

When the collar is heated and pressed, the edge 10 of the strip 8 forms a continuous and smooth fold line defining the cape from the collar band, so that no difficulty whatever is encountered by the operative in folding the cape upon the band after the collar has been ironed. The thermoplastic characteristic of the strip 8 unites the intermediate lining 4 with the outer ply 1, so that the collar will fold correctly upon the proper line of curvature along the line 10 when the cape is folded down upon the band of the collar.

Figure 4:
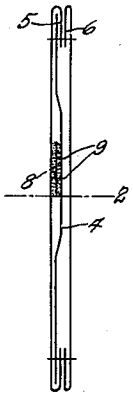
Fig. 4 is a diagrammatic sectional view on the line 4—4 of Fig. 1.
Figure 5:
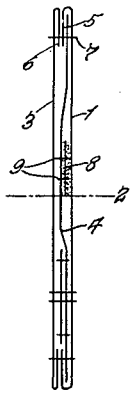
Fig. 5 is a diagrammatic sectional view on the line 5—5 of Fig. 1.
Figure 6:
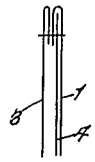
Fig. 6 is a diagrammatic sectional view on the line 6—6 of Fig. 1.

Moreover, as shown clearly in Figs. 4 and 5, there are only four plies of material at and along the fold line connecting the outer ply 1, the inner ply 3, the intermediate lining 4, and the defining coated strip 8 with each other. This dispenses with many of the thicknesses of material now customarily used or necessary in folded unitary collars, and not only avoids and eliminates discomfort to the wearer of the collar, but provides and defines definitely, accurately and precisely a fold line along which the operative may fold the cape of the collar upon the band with greater facility and speed. These matters have been determined empirically and, therefore, are definitely known. The elimination of thicknesses of material at or approximately along the fold line of the collar is a distinct advantage, and the provision of the defining strip 8 adhesively uniting the lining with the outer ply 1 also distinguishes this collar from others with which I am familiar.

The shape and configuration of said strip 8 may be varied without departure from the nature and principle of the invention. For instance, it may be made in the form of a straight strip with parallel edges, or as a curved strip. It distinctly reinforces against the elasticity of the collar along a line between the corners 11 even though mounted somewhat below the corners 11 in the cape. It holds the collar in better and more perfect form and shape when being worn, and this factor has also been determined by actual use and test.

I claim:

In a folded article of wearing apparel consisting of a cape portion and a band portion and having an outer ply and an inner ply of material and an interlining between said plies, the improvement comprising a narrow strip of thermoplastic fabric extending along one of said portions the full length of the article adjacent and defining the fold line and uniting and stiffening the outer ply and the interlining along said strip, the other portion and the remaining part of the portion to which it is applied being free from such attaching and stiffening material.

JOSEPH LYONS.